United States Patent [19]

Gaskins et al.

[11] Patent Number: 6,081,853
[45] Date of Patent: Jun. 27, 2000

[54] METHOD FOR TRANSFERRING BURST DATA IN A MICROPROCESSOR

[75] Inventors: Darius D. Gaskins; G. Glenn Henry, both of Austin, Tex.

[73] Assignee: IP First, LLC, Fremont, Calif.

[21] Appl. No.: 09/034,556

[22] Filed: Mar. 3, 1998

[51] Int. Cl.$^7$ .................................................. G06F 12/06
[52] U.S. Cl. ............................. 710/35; 710/34; 711/118; 711/137; 711/213; 711/217; 711/218; 711/219; 711/220; 365/230.03; 365/236; 365/239
[58] Field of Search ........................... 710/34, 35; 711/5, 711/113, 118, 137, 213, 217, 218, 219, 220; 365/230.03, 230.09, 236, 238.5, 239

[56] References Cited

U.S. PATENT DOCUMENTS

| | | | |
|---|---|---|---|
| 5,131,083 | 7/1992 | Crawford et al. | 710/29 |
| 5,255,378 | 10/1993 | Crawford et al. | 710/127 |
| 5,644,788 | 7/1997 | Courtright et al. | 710/35 |
| 5,825,788 | 10/1998 | Pawlowski | 714/763 |
| 5,831,926 | 11/1998 | Norris et al. | 365/230.04 |
| 5,912,854 | 6/1999 | Vogley et al. | 365/221 |

OTHER PUBLICATIONS

1997 IEEE International Solid State Circuits Conference, ISSCC97/Non–Volatile Memory and SRAM/Paper SP24.6.

*Primary Examiner*—Hiep T Nguyen
*Attorney, Agent, or Firm*—Richard K. Huffman; James W. Huffman

[57] ABSTRACT

A method for burst transferring of data in a processing system is provided. The processing system has a data bus width of W bytes (W even) and a cache line length of L bytes (L even). The cache line has L/W banks, the lowermost bank being in an odd position and the uppermost bank being in an even position. In a request for a particular data entity, a series of addresses are issued on the address bus to fill the associated cache line. The first address is always for a particular cache bank to which the particular data entity is mapped. The remaining addresses are sequenced ascending linearly, modulo L. If the particular data entity is mapped to an even cache bank, but not to the uppermost cache bank, then L/W remaining addresses are issued, beginning with the base address of the cache bank immediately following the cache bank to which the particular data entity is mapped.

30 Claims, 7 Drawing Sheets

METHOD FOR TRANSFERRING BURST DATA IN A MICROPROCESSOR

BACKGROUND OF THE INVENTION

1. Field of the Invention

This invention relates in general to the field of data transfer in computer systems, and more specifically to a method for transferring burst data in a processing system.

2. Description of the Related Art

Software programs that execute on a microprocessor consist of instructions, which together direct the microprocessor to perform a function. Each instruction directs the microprocessor to perform a specific operation, which is part of the function, such as loading data from memory, storing data in a register, or adding the contents of two registers.

In a desktop computer system, a software program is typically stored on a mass storage device such as a hard disk drive. When the software program is executed, its constituent instructions are copied into a portion of random access memory (RAM). Present day memories in computer systems consist primarily of devices utilizing dynamic RAM (DRAM) technologies.

Early microprocessors fetched instructions and accessed associated data directly from DRAM because the speed of these microprocessors was roughly equivalent to the DRAM speed. In more recent years, however, improvements in microprocessor speed have far outpaced improvements in DRAM speed. Consequently, today's typical processing system contains an additional memory structure known as a cache. The cache is used to temporarily store a subset of the instructions or data that are in DRAM. The cache is much faster than the DRAM memory, but it is also much smaller in size. Access to a memory location whose data is also present in the cache is achieved much faster than having to access the memory location in DRAM memory.

Cache memory is typically located between main memory (i.e., DRAM memory) and the microprocessor. In addition, some microprocessors incorporate cache memory on-chip. Wherever the cache resides, its role is to store a subset of the instructions/data that are to be processed by the microprocessor.

When a processing unit in a microprocessor requests data from memory, the cache unit determines if the requested data is present and valid within the cache. If so, then the cache unit provides the data directly to the processing unit. This is known as a cache hit. If the requested data is not present and valid within the cache, then the requested data must be fetched from main memory (i.e., DRAM) and provided to the processing unit. This is known as a cache miss.

Structurally, a cache consists of a number of cache lines, the cache lines consisting of multiple bytes of data. Typical cache lines range in length from 4 to 256 bytes. Each cache line is associated with, or mapped to, a particular region in main memory. Thus, when a cache miss happens, the entire cache line must be filled, that is, multiple locations in memory must be transferred to the cache to completely fill the cache line. Although conventional processing systems have data bus widths that are capable of transferring multiple bytes of data from memory in a single read operation, with rare exception a given processing system's data bus is much smaller than its cache line length. Because of this, its cache line is subdivided into banks of data, the banks being equivalent in size to the data bus width. Thus, each read from memory is stored into a distinct cache bank within the cache line. The number of reads required to fill the cache line is equal to the number of cache banks within the cache line.

Multiple reads from memory take time. A technique commonly used to overcome the delays inherent in multiple reads is known as a burst read. The burst read is characterized in that, along with control signals, an initial address is provided on an address bus to memory. In response, the memory provides a burst of data items to fill the cache line. The number and sequence of the data items comprising the burst are most often predetermined system parameters. Each data item read from memory is stored in its corresponding bank within the cache line until all of the banks have been transferred from memory. Sequencing of data items within a burst transfer currently is designed to optimize attributes of the processing system such as compatibility with existing memory architectures.

In older processing systems utilizing cache memory, the processing unit was not able to access data in a cache line until the entire cache line had been filled. This is not true today. Present day processing systems provide the capability for the processing unit to access partially filled cache lines.

Because a bank within a partially filled cache line can now be accessed, the sequence of the data items transferred during a burst read becomes significant from the standpoint of anticipated data use. One skilled in the art will readily appreciate that the most likely data to be requested by an instruction, following a request that prompts a cache line fill, is contained within a next sequential memory address. The memory address may be mapped to the same bank or a next sequential bank in the cache. Yet in roughly half the cases for extant sequences, the second cache bank to be transferred during a burst is not the next sequential bank. This is a problem. Because of limitations imposed by current sequences, a processing unit that is capable and ready to access a cache bank may be forced to wait until the data that it needs is read into cache.

One skilled in the art will observe from the above that causing a processing unit to wait for data in roughly half of the cache misses that happen will markedly increase the execution time for most programs. Any means of reducing execution time is highly desirable.

Therefore, what is needed is a method for transferring burst data in a microprocessor whose sequencing is optimized for anticipated data use. In addition, what is needed is a burst sequence that is ordered to transfer the data most likely to be required by the following instruction.

SUMMARY

To address the above-detailed deficiencies, it is an object of the present invention to provide a method for transferring burst data in a microprocessor that orders the data so that undue delays are not caused during a cache line fill.

Another object of the invention is to provide a method for transferring burst data in a microprocessor that implements a next sequential linear order for cache line fills where the requested data is mapped to an even cache bank.

Accordingly, in the attainment of the aforementioned objects, it is a feature of the present invention to provide a method for burst transferring of data in a processing system, the processing system having a data bus width of W bytes and a cache line length of L bytes, the cache line having L/W banks, where W and L are even numbers, the lowermost bank being in an odd position and the uppermost bank being in an even position. The method includes determining a particular bank within a particular cache line for storage of a particular data entity; generating an initial address, $A_0$, for retrieving the particular data entity, where the initial address, $A_0$, is the base address of the particular bank; issuing the initial address, $A_0$, on an address bus to retrieve the particular data entity into the cache line; if the particular bank within the particular cache line is in an even position, but is not the uppermost bank, generating a sequence of remaining addresses, where each one of the remaining addresses is determined relative to the initial address according to the relationship:

$$A_i = [A_0 + (i \times W)] \bmod L; i = 1, 2, \ldots, \frac{L}{W};$$

where $A_i$ represents an $i^{th}$ address in the sequence of remaining addresses; and applying the remaining addresses on the address bus to retrieve remaining data entities into the cache line.

An advantage of the present invention is a burst sequence for data mapped to an even cache bank provides the data most likely to be required by a following instruction during the second read of the burst.

In another aspect, it is a feature of the present invention to provide a method for burst transferring of data in a processing system, the processing system having a data bus width of W bytes and a cache line length of L bytes, the cache line having L/W banks, where W and L are even numbers, the lowermost bank being in an odd position and the uppermost bank being in an even position. The method includes determining a particular bank within a particular cache line for storage of a particular data entity; generating an initial address, $A_0$, for retrieving the particular data entity, where the initial address, $A_0$, is the base address of the particular bank; issuing the initial address, $A_0$, on an address bus to retrieve the particular data entity into the cache line; if the particular bank within the particular cache line is in an even position, but is not the uppermost bank, generating a sequence of remaining addresses, where each one of the remaining addresses is determined relative to the initial address according to the relationship:

$$A_i = [A_0 + (i \times W)] \bmod L; i = 1, 2, \ldots, \frac{L}{W}; \text{ or}$$

if the particular bank within the particular cache line is the uppermost bank, generating the sequence of remaining addresses, where each one of the remaining addresses is determined relative to the initial address according to the relationship:

$$A_i = \{A_0 + [(i-2) \times W]\} \bmod L; i = 1, 2, \ldots, \frac{L}{W};$$

wherein $A_i$ represents an $i^{th}$ address in the sequence of remaining addresses; and applying the remaining addresses on the address bus to retrieve remaining data entities into the cache line.

Another advantage of the present invention is that burst sequences are optimized so that a processing unit does not have to wait for data contained in a next sequential cache bank.

In yet another aspect, it is a feature of the present invention to provide a method for burst transferring of data in a processing system having a data bus width of eight bytes and a cache line length of 32 bytes, the cache line having four sequentially-ordered banks. The method includes determining a particular bank within a particular cache line for storage of a particular data entity; generating an initial address, $A_0$, for retrieving the particular data entity, where the initial address, $A_0$, is the base address of the particular bank; issuing the initial address, $A_0$, on an address bus to retrieve the particular data entity into the cache line; if the particular bank is bank 2, generating a sequence of four remaining addresses, where each one of the remaining addresses is a base address for a next sequential bank within the particular cache line, and where, following generation of a base address for bank 4, the sequence wraps back around to generate a base address for bank 1; or if the particular bank is bank 4, generating a sequence of four remaining addresses beginning with a base address for bank 3, and continuing next to a base address for bank 4, and continuing next to a base address for bank 1, and completing the sequence with a base address for bank 2; or if the particular bank within the particular cache line is bank 1 or bank 3, generating a sequence of three remaining addresses, where each one of the remaining addresses is a base address for a next sequential bank within the particular cache line, and where, following generation of a base address for bank 4, the sequence wraps back around to generate a base address for bank 1; and applying the remaining addresses on the address bus to retrieve remaining data entities into the cache line.

Yet another advantage of the present invention is that typical software programs will execute faster because burst transfers are ordered with respect to anticipated use of data.

BRIEF DESCRIPTION OF THE DRAWINGS

These and other objects, features, and advantages of the present invention will become better understood with regard to the following description, and accompanying drawings where.

DETAILED DESCRIPTION

Figure 1:
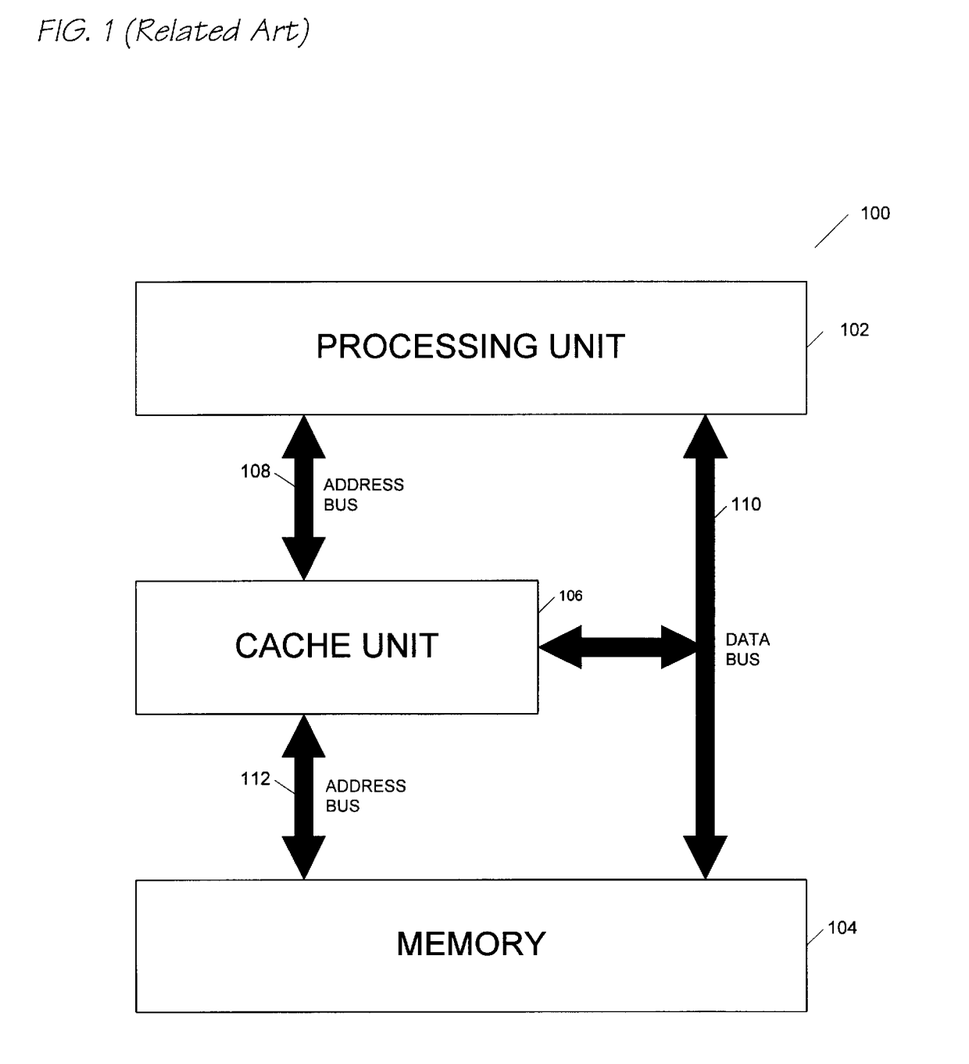
FIG. 1 is a block diagram of a related art processing system.

Referring to FIG. 1, a block diagram of a related art processing system 100 is shown. The processing system 100 includes a processing unit 102, connected to a memory 104 via a data bus 110. The processing system 100 also includes a cache unit 106. The cache unit 106 is connected to the processing unit 102 via both a processor address bus 108 and the data bus 110. The cache unit 106 is also connected to the memory 104 via a memory address bus 112 and the data bus 110.

Operationally, the processing unit 102 executes instructions that are stored in the memory 104. In addition, the processing unit retrieves data from, or stores data to, the memory 104. To retrieve an instruction or access (i.e., store or retrieve) data, the processing unit 102 provides an address of a memory location on the processor address bus 108. The memory 104 accesses the memory location specified by the address and provides the contents of the memory location (i.e., the instruction or the data) to the processing unit 102 on the data bus 110.

As mentioned above, early microprocessors operated at approximately the same speed as their associated memory devices. Hence, instructions and data were fetched directly from dynamic random access memory (DRAM) or read-only memory (ROM) without incurring undue delays. Today, a typical microprocessor operates almost an order of magnitude faster than those more economical memory technologies. Now, if instructions/data are fetched directly from main memory 104, the processing unit 102 is forced to wait until the memory 104 can provide the requested data.

Whether the consequent wait is acceptable or unacceptable depends upon the application of the microprocessor. For example, a microprocessor in a thermostat, which is used to control the temperature in a home, would not be affected negatively by having to wait on data from memory 104. The operations that it performs are simple; they do not require access to data any faster than DRAM or ROM can typically provide. On the other hand, a microprocessor in a desktop computer system operates in an application environment where speed is significant; it is unacceptable to wait for data each time a memory access is required.

To circumvent the wait associated with accessing data from slower memory devices, a conventional processing system 100 retains a copy of frequently used data from memory 104 in a cache unit 106. The cache unit 106 is much faster than the memory 104. Although faster with regard to accessing data, the capacity of the cache unit 106 is less than that of the memory 104. Because of this, software and hardware within the processing system 100 operate together to insure that frequently accessed data in memory 104 are present in the cache unit 106 so that the processing unit 102 does not have to wait for the data.

In operation, the cache unit 106 reads the address provided by the processing unit 108, and determines if the requested data is both present and valid within the cache unit 106. The case where the requested data is present and valid within the cache unit 106 is referred to as a cache hit. In the event of a cache hit, the cache unit 106 provides the requested data to the processing unit 102 on the data bus 110, and does not forward the address to memory 104. The case where the requested data is not present and valid in the cache unit 106 is referred to as a cache miss. In a cache miss, the cache unit 106 forwards the address to the memory 104 over the memory address bus 112. The memory 104 then provides the requested data to the processing unit over the data bus 110.

Declaration of a hit within the cache unit 106 involves a determination of both the presence and the validity of a memory location within the cache unit 106. Hence, a means is provided to allow the processing system 100 to know which memory locations from the memory 104 are present and valid. The contents of a particular location in the cache unit 106 are valid if they have been updated to contain the most recent data for that memory location. The operation of a cache unit is discussed in more detail with reference to FIG. 2.

Figure 2:
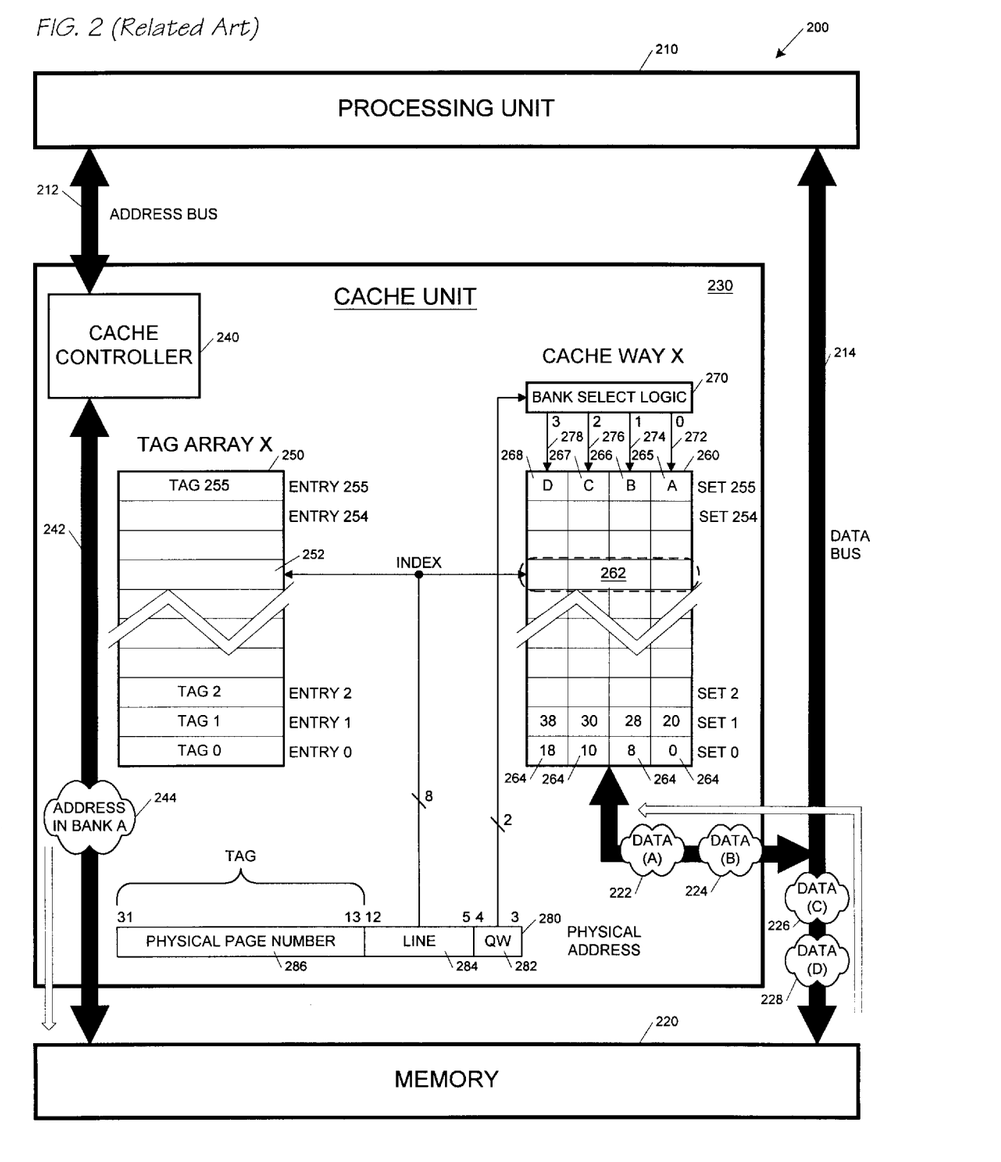
FIG. 2 is a block diagram of a related art processing system featuring execution of a burst read by a cache unit.

In FIG. 2, a block diagram of a related art processing system 200 is shown. The processing system 200 includes a processing unit 210, connected to a memory 220 via a data bus 214. The processing system 200 also includes a cache unit 230. The cache unit 230 is connected to the processing unit 210 via a processor address bus 212 and the data bus 214. The cache unit 230 is connected to the memory 220 via a memory address bus 242 and the data bus 214. One skilled in the art will appreciate that the cache unit 230 may reside either on-chip with the processing unit 210 or may be in a separate package.

The cache unit 230 includes a cache way 260, a tag array 250, and a cache controller 240. The cache controller is connected to the processor address bus 212 and the memory address bus 242. The cache way 260 is connected to the data bus 214. The cache way 260 and the tag array 250 are both coupled to the cache controller 240.

In operation, the cache way 260 stores lines of data from the memory 220. The tag array 250 stores information indicating the presence and validity of the lines of data from the memory 220 that are stored in the cache way 260. The cache controller 240 loads the lines of data from the memory 220 into the cache way 260, retrieves/stores data from/to the cache way 260 when a cache hit occurs, and controls access to memory 220 when a cache miss occurs.

Several classes of cache unit architectures are routinely used today to include a direct-mapped cache (i.e., 1-way set associative cache), a 2-way set associative cache, and a 4-way set associative cache. A direct-mapped cache has one cache way, a 2-way cache has two cache ways, and a 4-way cache has four cache ways. FIG. 2 illustrates a single cache way 260, CACHE WAY X. Regardless of the number of ways within a cache unit 230, each of the ways are typically of the same size and structure.

The cache way 260 in FIG. 2 is composed of sets 262. A set 262 is simply a subdivision of the cache way 262, usually some small number of bytes in size. A set 262 is the smallest unit of data that a cache unit 230 can map in the tag array 250. For example, in FIG. 2, a set 262 is 32 bytes in size. A set 262 may also be referred to as a cache line 262. FIG. 2 depicts 256 sets 262 in the cache bank 260. Thus, the cache way 260 is 8 kilobytes (8 kB) in size. That is, 8,192 bytes of data from memory 220 can be stored in the cache bank 260. If there is only one cache way 260, then only 8,192 bytes of data can be present in the cache unit 230 at any given point in time. Using more than one cache way 260 allows the cache unit 230 to increase in storage capacity in 8 kB blocks.

Most cache architectures do not allow for random storage of a location from memory 220 within the cache way 260. Rather, the memory 220 is viewed as a sequence of pages, which are each equal in structure and size to the cache way 260. For instance, if the memory 220 were 4 gigabytes (4 GB) in size, then it would consist of 524,288 (512 k) pages, each page being 8 kB in size. To reduce the time required to determine a cache hit, a given location within a page in memory 220 is associated with (i.e., mapped to) a corresponding set 262 within the cache way 260. To determine if the given location within a page in memory 220 is present and valid within the cache way 260 only requires an evaluation only of information in the tag array 250 for the corresponding set 260.

Each time data in memory 220 is stored in a set 262 within the cache way 260, the physical page number 286 of the memory location for the data is stored in a corresponding tag entry 252 in the tag array 250. The physical page number 286 is simply the upper bits of the physical address 280.

Note in FIG. 2, since data in memory 220 is uniquely mapped into sets 262, there is no need to store the complete physical address 280 within the tag array 250; only the upper bits 286 that uniquely identify the page in memory 220 that is mapped to a given set 262 are required to be stored in the corresponding tag entry 252.

If the processing unit 210 requests to read a specific data entity, then the cache controller 240 receives the physical address 280 of the specific data entity from the processor address bus 212. Lower bits 284 of the physical address 280 are used to index an associated set 262 and tag entry 252. Contents of the tag entry 252 corresponding to the specific data entity is provided to the cache controller 240 for evaluation. If the cache controller 240 determines that there is a cache hit, then the specific data entity is retrieved from the associated set 262 and provided to the processing unit 210 on the data bus 214. If there is a cache miss, then the cache controller 240 provides the physical address 280 of the specific data entity to the memory 220 on the memory address bus 242 for retrieval.

In practice, the size of a set 262 (i.e., cache line 262 size) varies. For a fixed number of bytes in a cache way 260, decreasing the cache line size requires an increasing the number of tag information bytes in the tag array 250. Because of the decrease in cache line 262 size, the number of addressable sets 262 in the cache way 260 increases and, hence, the number of address bits 286 required to uniquely identify the contents of a set 262 increases. Conversely, an increase in the size of the cache line 262 results in a decrease in the size of the tag array 250.

In addition to affecting the size of the tag array 250, varying the cache line 262 size influences other performance metrics within the processing system 200. There are a number of tradeoff factors used to specify the size of a given cache line 262. Consequently, those skilled in the art will appreciate that typical cache lines vary in size from 4 bytes to 256 bytes. The size of a cache line 262 is commonly called cache line length.

Since the length of the cache line 262 is typically larger than the size of the data bus 214, the cache unit 230 also provides a means of storing and retrieving data entities that are the size of the data bus 214, from within the cache line 262. The size of the data bus 214 is commonly called the data bus width. FIG. 2 shows the cache line 262 divided into four cache banks 264, each cache bank 264 being equal in size to the data bus width. Each of the cache banks 264 consist of eight bytes (i.e., a quadword). Thus, low-order bits 282 of the physical address 280 are provided to bank select logic 270 to index a specific bank 264. Cache banks 264 in a set 262 are typically arranged sequentially according to address. For the example shown in FIG. 2, address 00H from a memory 220 page is mapped to bank 0 of set 0 in the cache way 260. Similarly, address 30H is mapped to bank 2 of set 1. A specific data item in, say, location 87651234H in memory 220, would be mapped to bank 2 of set 91H (i.e., decimal 135). The upper 19 address bits 286 of the physical address 280 of the location would be placed in tag entry 91H. Because the data bus 214 accesses data in 8-byte chunks, address bits 0 and 1 of the physical address 280 are not required to index data within the cache unit 230.

FIG. 2 illustrates bank selection specifically with respect to SET 255. Bank 0 line 262 selects the lowermost bank, BANK A 265. This lowermost bank 265, since it is the first bank, is in an odd position. BANK B 266, selected by bank 1 line 274, is in an even position. Bank 2 line 276 selects the next higher odd bank, or BANK C 267. Bank 3 line 278 selects the uppermost bank, BANK D 268.

Because the cache line 262 is the smallest unit of information that can be mapped in a cache unit 230, it follows that each time a cache miss occurs an entire cache line 262 of data must be read from memory 220. This is called a cache line fill. Filling an entire cache line 262 requires several accesses to memory 220. To counter this problem, most cache units 230 today are designed to do a burst transfer when performing a cache line fill. In a burst transfer, an initial address is presented on the memory address bus 242 along with control signals (not shown) to request a cache line fill. The memory 220 then provides a burst (i.e., back-to-back) of data entities over the data bus 214 to fill the cache line 262. The number of data entities transferred in the burst and their respective order is must be established by design. Various means are used in conventional processing systems 200 to establish the number and order of data entities for the burst.

FIG. 2 further illustrates a cache line fill following a cache miss. As a result of the miss, the cache controller 240 places an address 244 for a memory location on the memory address bus 242. The memory location is mapped to BANK A 265. Control signals (not shown) to the memory 220 indicate that this operation is a cache line fill. A burst of data to fill the associated cache line is read from memory 220 over the data bus 214. In response to the request and address 244, the memory 220 provides first DATA (A) 222, next DATA (B) 224, next DATA (C) 226, and finally DATA (D) 228. The sequencing of these data items in time is shown in FIG. 3.

Figure 3:
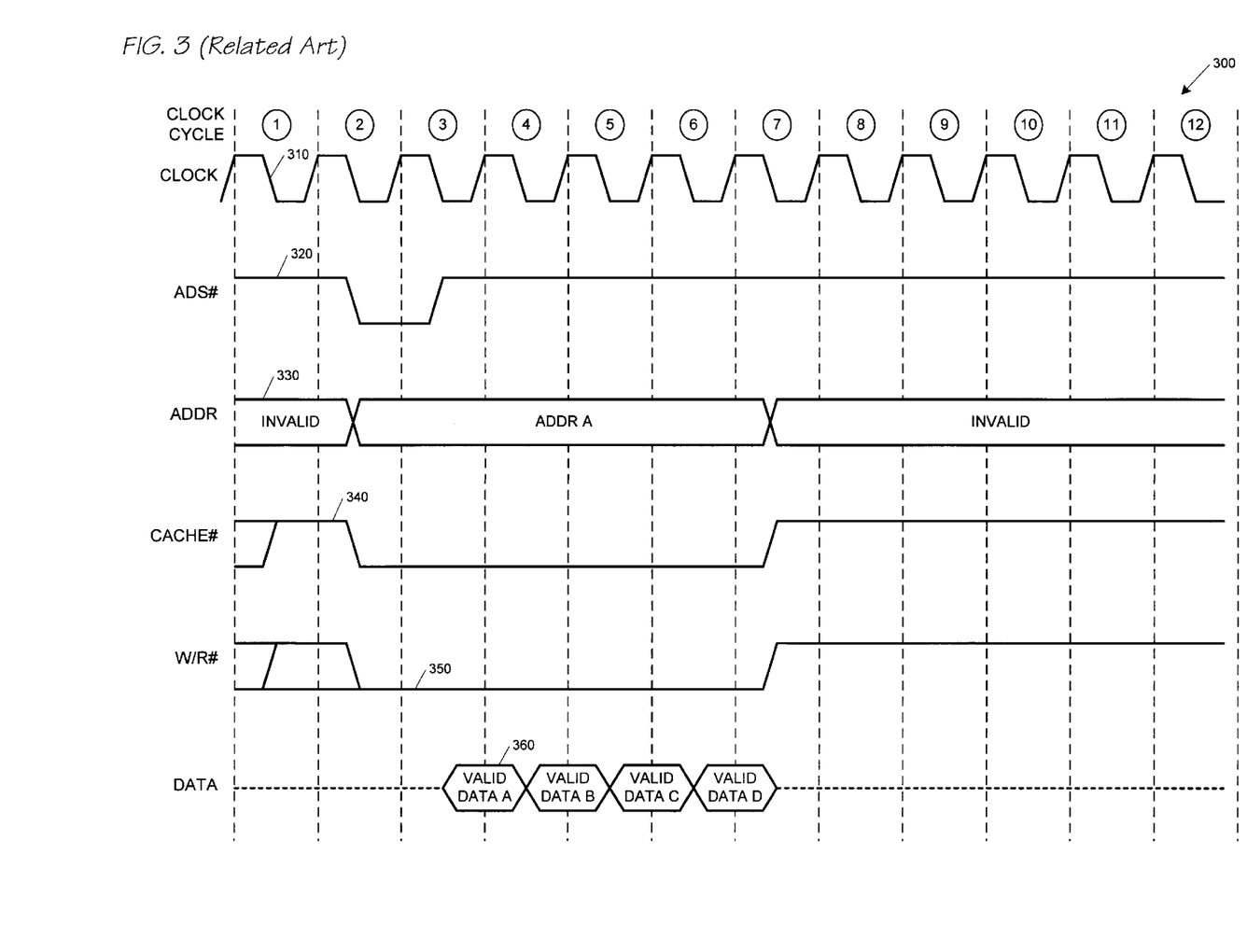
FIG. 3 is a timing diagram illustrating address/data signal states of the processing system of FIG. 2 when executing the burst read.

Referring to FIG. 3, a timing diagram 300 is shown illustrating address/data signal states of the processing system 200 of FIG. 2 when executing the burst read. The timing diagram 300 includes a CLOCK signal 310; an ADS# signal 320, indicating that an address placed on the memory address bus 242 is valid; an ADDR signal 330, representing a complete set of signals to communicate the physical address 280 to memory 220; a CACHE# signal 340, indicating a request for a cache line 262 fill; a W/R# signal 350, indicating whether the request on the bus is for a read or a write; and a DATA signal 360, representing a complete set of signals to communicate the number of bytes comprising the width of the data bus. Execution of the burst read is shown with respect to cycles of the CLOCK 310.

During cycle 1, ADDR 330 is in an indeterminate state.

The burst transfer cycle begins in cycle 2, when the physical address 280 for memory location A is provided on ADDR 330. In conjunction, ADS# 320 indicates that the address on ADDR 330 is valid, CACHE# 340 indicates that the requested operation is for a burst transfer, and W/R# 350 indicates that the requested operation is a read operation.

The memory 220 responds in cycle 3 by providing the data from memory location A on DATA 360.

During cycle 4, data from memory location B is provided on DATA 360. CACHE# 340 and W/R# 350 remain low during this cycle to indicate an ongoing cache line read.

During cycle 5, data from memory location C is provided on DATA 360. CACHE# 340 and W/R# 350 remain low during this cycle to indicate an ongoing cache line read.

During cycle 6, data from memory location D is provided on DATA 360. CACHE# 340 and W/R# 350 remain low during this cycle to indicate an ongoing cache line read.

During cycle 7, ADDR 330 goes to an indeterminate state. CACHE# 340 and W/R# 350 go back high to indicate that the burst transfer is completed. At this point, the burst transfer is complete.

To increase the speed at which application programs run, today's processing systems 200 are designed to execute out of cache as much as possible. However, the sequencing of data entities for a burst transfer has been more a function of architectural limitations imposed by the use of older memory devices. The sequence presented in FIG. 3 is commonly used for burst transfers when the requested memory location is mapped to an odd bank position in the cache way 260. The timing diagram 300 shows a linear sequencing of data entities, A-B-C-D. For burst transfers that begin at odd bank positions other than the first bank position, after specifying the uppermost bank position, the sequence wraps back around to the first bank position. Thus, a request for a burst transfer beginning with memory location C would result in a burst sequence of C-D-A-B.

For burst transfers that begin with a memory location mapped to an odd cache bank, the sequencing illustrated in FIG. 3 applies. However, for a burst transfer beginning with a memory location that is mapped to an even cache bank, a modified linear sequencing is used. Modified linear sequencing is portrayed more specifically in FIG. 4.

Figure 4:
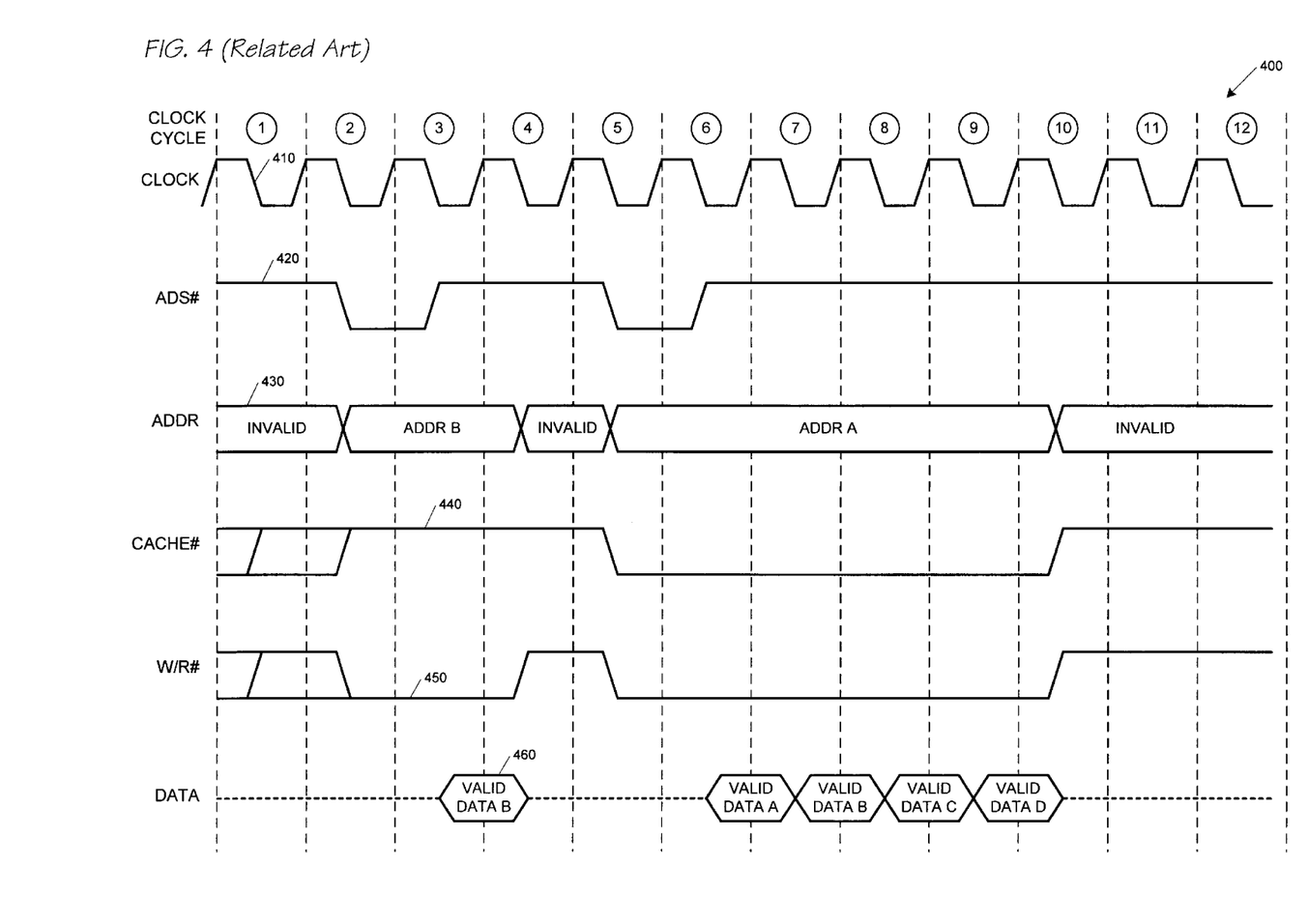
FIG. 4 is a timing diagram illustrating address/data signal states of the processing system of FIG. 2 when executing a cache line fill initiated by a request for data associated with an even cache bank.

Referring to FIG. 4, a timing diagram 400 is presented, illustrating address/data signal states of the processing system of FIG. 2 when executing a cache line fill initiated by a request for data associated with an even cache bank. Like signals are referenced with like numbers, the hundreds digit replaced with a 4. The timing diagram 400 illustrates execution of a burst transfer beginning with a memory location associated with BANK B 265, an even bank Rather than initiate the burst transfer, in cycle 2 an address for the memory location mapped to the even cache bank is provided on the memory address bus 242 for execution of a single read operation. The state of CACHE# 440 indicates that the requested operation is not a burst operation.

During cycle 3, the data from memory location B is provided on the data bus 214.

During cycle 4, the cache unit 230 completes the transfer of data from memory location B.

The burst transfer begins in cycle 5, when the physical address 280 for memory location A is provided on ADDR 430. CACHE# 440 indicates that the requested operation is for a burst transfer, and W/R# 450 indicates that the requested operation is a read operation.

The memory 220 responds in cycle 6 by providing the data from memory location A on DATA 460.

During cycle 7, data from memory location B is provided on DATA 460. CACHE# 440 and W/R# 450 remain low during this cycle to indicate an ongoing cache line read.

During cycle 8, data from memory location C is provided on DATA 460. CACHE# 440 and W/R# 450 remain low during this cycle to indicate an ongoing cache line read.

During cycle 9, data from memory location D is provided on DATA 460. CACHE# 440 and W/R# 450 remain low during this cycle to indicate an ongoing cache line read.

During cycle 10, ADDR 430 goes to an indeterminate state. CACHE# 440 and W/R# 450 go back high to indicate that the burst transfer is completed.

As the timing diagram 400 depicts, when the requested memory location is associated with an even cache bank, a cache line fill is accomplished by performing a single read for the requested memory location followed by a burst transfer beginning with the memory location associated with the immediately preceding cache bank The sequence presented in FIG. 4 is commonly used for burst transfers when the requested memory location will occupy an odd bank position in the cache way 260. The timing diagram 400 shows a single read followed by a burst transfer with modified linear sequencing of data entities, B+A-B-C-D. For burst transfers that begin at even bank positions other than that shown, after specifying the uppermost bank position, the sequence wraps back around to the first position. Hence, a request for a burst transfer beginning with memory location D would result in a burst sequence of D+C-D-A-B.

For microprocessors that cannot access requested data until the cache line fill is completed, the burst sequences shown in FIG. 3 and FIG. 4 are acceptable. Yet, recent improvements in microprocessor designs now allow the processing unit 210 to access requested data prior to the completion of a cache line fill. Specifically, the processing unit 210 is able to access the requested data in BANK A 265 during cycle 4 of FIG. 3 rather than having to wait until cycle 7 when the cache line fill is completed.

One skilled in the art will appreciate that cache architectures in general are extremely effective primarily because of the principle of spatial locality. Spatial locality means that programs and their requested data tend to reside in adjacent memory locations. It further means that programs are likely to need data items that are stored in locations close to those locations that are already in use. A specific example of this principle can be seen with respect to FIG. 3.

In FIG. 3, the principle of spatial locality is exemplified in that the request for data in the memory location associated with cache BANK A 265 will most likely be followed by a request for data in the memory location associated with cache BANK B 266 or the uppermost cache bank in the preceding sequential set, SET 254. Since the processing unit 210 can access data prior to the completion of a cache line fill, if a request for data in the memory location associated with cache BANK B 266 immediately follows the request for data in the memory location associated with cache BANK A 265, then the processing unit 210 will not have to wait for the data; the data will be already present in BANK B 266.

One skilled in the art will moreover acknowledge that, while a program is likely to subsequently request data an adjacent memory location, it is yet even more likely to request data from a next sequential memory location. For the case when the initial request is for data mapped to an odd cache bank, then the conventional sequencing shown in FIG. 3 is optimum. However, in the event that the initial request is for data mapped to an even cache bank, then the conventional sequencing shown in FIG. 4 is not optimum. Note that the sequencing in FIG. 4 is B+A-B-C-D. Following the initial request for data associated with cache BANK B 266, the most likely next request is for data associated with cache BANK C 266—not cache BANK A 265. This is a problem. As a result of the modified linear sequencing shown in FIG. 4, the processing unit 210 is forced to wait at least two extra cycles until data associated with cache BANK C 266 is present in the cache way 260. One skilled in the art will observe that roughly half of the cache misses in a processing system 200 are associated with an even cache bank. If the principle of spatial locality prevails to the extent that the most likely data requests within a given program are for next sequential memory locations, then a 2-cycle (minimum) delay for each of these requests can adversely impact the time required to execute the given program. The problem associated with the sequencing of data items in a burst transfer is addressed by the present invention.

Figure 5:
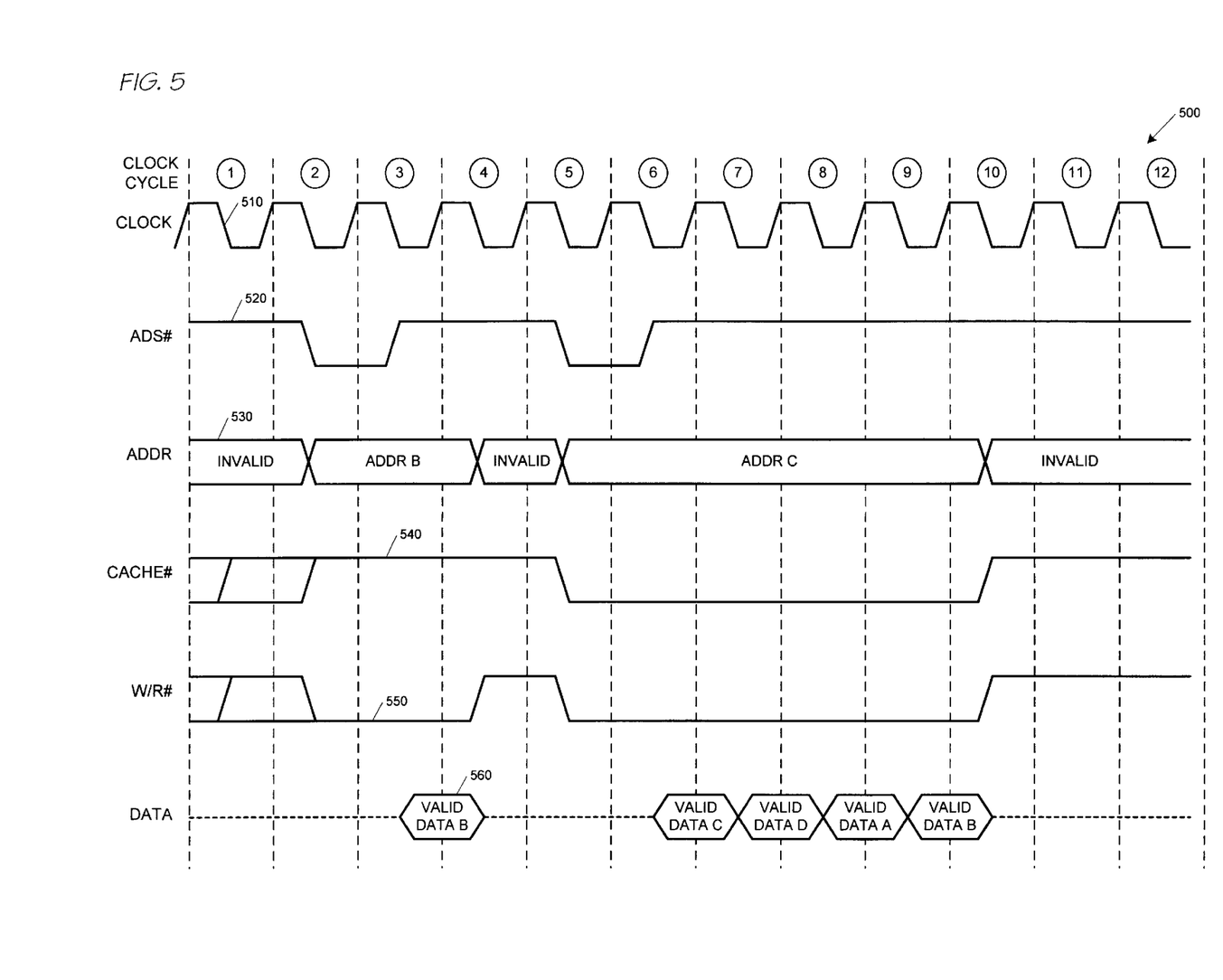
FIG. 5 is a timing diagram illustrating address/data signal states of a processing system incorporating an embodiment of the present invention when executing a cache line fill initiated by a request for data associated with an even cache bank.

Now referring to FIG. 5, a timing diagram 500 is presented, illustrating address/data signal states of a processing system incorporating an embodiment of the present invention when executing a cache line fill initiated by a request for data associated with an even cache bank. Like signals are referenced with like numbers, the hundreds digit replaced with a 5. The timing diagram 500 illustrates execution of a burst transfer beginning with a memory location associated with an even bank (not shown), BANK B, similar to that of FIG. 2.

In cycle 2, an address for a memory location mapped to BANK B is provided on ADDR 530 for execution of a single read operation. The state of CACHE# 540 indicates that the requested operation is not a burst operation.

During cycle 3, the data from memory location B is provided on DATA 560

During cycle 4, the cache unit (not shown) completes the transfer of data from memory location B.

The burst transfer begins in cycle 5, when the address for memory location C-the most likely location to be requested by the following instruction-is provided on ADDR 530. CACHE# 540 indicates that the requested operation is for a burst transfer, and W/R# 550 indicates that the requested operation is a read operation.

During cycle 6, the memory (not shown) responds by providing the data from memory location C on DATA 560.

During cycle 7, data from memory location D is provided on DATA 560. CACHE# 540 and W/R# 550 remain low during this cycle to indicate an ongoing cache line read.

During cycle 8, data from memory location A is provided on DATA 560. CACHE# 540 and W/R# 550 remain low during this cycle to indicate an ongoing cache line read.

During cycle 9, data from memory location B is provided on DATA 560. CACHE# 540 and W/R# 550 remain low during this cycle to indicate an ongoing cache line read.

During cycle 10, ADDR 530 goes to an indeterminate state. CACHE# 540 and W/R# 550 go back high to indicate that the burst transfer is completed.

As the timing diagram 500 for the present invention depicts, when the requested memory location is associated with an even cache bank, a cache line fill is accomplished by performing a single read for the requested memory location followed by a burst transfer beginning with the memory location mapped to the next sequential cache bank—the cache bank whose data is most likely to be requested in the following instruction. The timing diagram 500 shows the single read followed by a burst transfer with next sequential linear sequencing of data entities, B+C-D-A-B. For burst transfers that begin at even bank positions other than the uppermost bank position, after specifying the uppermost bank position, the sequence wraps back around to the first position.

The sequencing shown in FIG. 5 is for a cache line comprising four cache banks: A, B, C, and D. One skilled in the art will appreciate that the present invention applies for any number of cache banks. For example, in a processing system comprising eight cache banks, A through H, a request for data associated with bank D would result in the sequence D+E-F-G-H-A-B-C-D.

In the event that the request for data is associated with the uppermost bank in a cache line, then the following instruction will most likely request data in the next sequential cache line. But the next sequential cache line cannot be filled until the current cache line fill is completed. Therefore, for the case of a data request associated with the uppermost bank in a cache line, the present invention invokes a sequencing that will provide data associated with the previous sequential cache bank as the first item in a burst transfer. This case is more completely illustrated in FIG. 6.

Figure 6:
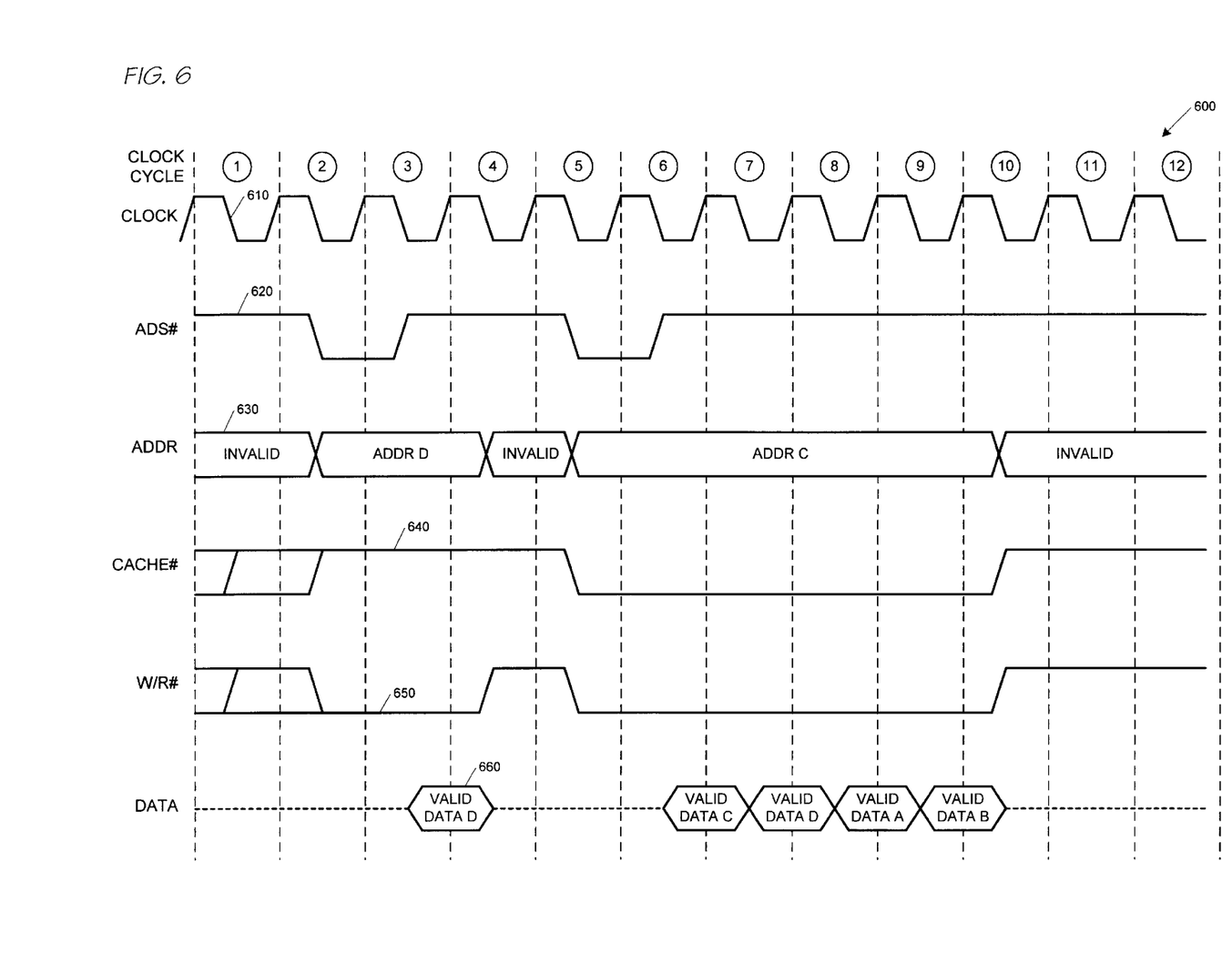
FIG. 6 is a timing diagram illustrating address/data signal states of a processing system incorporating an embodiment of the present invention when executing a cache line fill initiated by a request for data associated with an uppermost cache bank in a cache line.

Now referring to FIG. 6, a timing diagram 600 is presented, illustrating address/data signal states of a processing system incorporating an embodiment of the present invention when executing a cache line fill initiated by a request for data associated with an uppermost cache bank. Like signals are referenced with like numbers, the hundreds digit replaced with a 6. The timing diagram 600 illustrates execution of a burst transfer beginning with a memory location mapped to the uppermost bank (not shown), BANK D, similar to that of FIG. 2.

In cycle 2, an address for the memory location mapped to BANK D is provided on ADDR 630 for execution of a single read operation. The state of CACHE# 640 indicates that the requested operation is not a burst operation.

During cycle 3, the data from memory location D is provided on DATA 660.

During cycle 4, the cache unit (not shown) completes the transfer of data from memory location D.

The burst transfer begins in cycle 5, when the physical address for memory location C—the most likely location within the current cache line to be requested by the following instruction—is provided on ADDR 630. CACHE# 640 indicates that the requested operation is for a burst transfer, and W/R# 650 indicates that the requested operation is a read operation.

During cycle 6, the memory (not shown) responds by providing the data from memory location C on DATA 660.

During cycle 7, data from memory location D is provided on DATA 660. CACHE# 640 and W/R# 650 remain low during this cycle to indicate an ongoing cache line read.

During cycle 8, data from memory location A is provided on DATA 660. CACHE# 640 and W/R# 650 remain low during this cycle to indicate an ongoing cache line read.

During cycle 9, data from memory location B is provided on DATA 660. CACHE# 640 and W/R# 650 remain low during this cycle to indicate an ongoing cache line read.

During cycle 10, ADDR 630 goes to an indeterminate state. CACHE# 640 and W/R# 650 go back high to indicate that the burst transfer is completed.

As the timing diagram 600 depicts, when the requested memory location is associated with an uppermost cache bank, a cache line fill is accomplished by performing a single read for the requested memory location followed by a burst transfer beginning with the memory location for the immediately preceding cache bank—the cache bank in the current cache line whose data is most likely to be requested in the following instruction. The timing diagram 600 shows the single read followed by a burst transfer with sequencing of data entities, D+C-D-A-B.

The sequencing according to the present invention can be expressed for the general case as follows. In a processing system comprising a data bus of width W bytes (W even) and a cache line length of L bytes (L even), the number of cache banks within the cache line is then L/W. If a processing unit in the processing system issues a request for a particular data entity, then the cache controller must first determine a particular bank within a particular cache line for storage of the particular data entity. Regardless of the position of the particular cache bank within the particular cache line, the first address in the sequence is always the base address for the particular cache bank, referred to as $A_0$. The processing system generates the initial address, $A_0$, on the address bus to retrieve the particular data entity into the cache line.

If the particular bank is in an even position, but not the uppermost position, then the number and order of the remaining addresses in the sequence are expressed by the expression:

$$A_i = [A_0 + (i \times W)] \bmod L; i = 1, 2, \ldots, \frac{L}{W};$$

wherein $A_i$ represents an $i^{th}$ address in the sequence of remaining addresses. For example, if the processing system has a 32-byte cache line length (L) and an 8-byte data bus width (W), then there are 4 (L/W) cache banks. If $A_0$ is equal to 3328H, then the expression completes the sequence with four remaining addresses: 3330H ($A_1$), 3338H ($A_2$), 3320H ($A_3$), and 3328H ($A_4$).

If the particular bank within the particular cache line is in an odd position, then the number and order of the remaining addresses in the sequence are given by the expression:

$$A_i = [A_0 + (i \times W)] \bmod L; i = 1, 2, \ldots, \left(\frac{L}{W} - 1\right).$$

For the example where L=32 and W=8 as above, if $A_0$ is equal to 3330H, then the expression completes the sequence with three remaining addresses: 3338H ($A_1$), 3320H ($A_2$), and 3328H ($A_3$).

If the particular bank within the particular cache line is in an uppermost position, then the number and order of the remaining addresses in the sequence are given by the expression:

$$A_i = \{A_0 + [(i - 2) \times W]\} \bmod L; i = 1, 2, \ldots, \frac{L}{W}.$$

For the example where L=32 and W=8 as above, if $A_0$ is equal to 3338H, then the expression completes the sequence with four remaining addresses: 3330H ($A_1$), 3338H ($A_2$), and 3320H ($A_3$), and 3328H ($A_4$).

By sequencing the data in a burst transfer as shown in FIG. 5, the problem discussed with reference to FIG. 4 has been eliminated. A processing system incorporating an embodiment of the present invention will not have to wait additional cycles for the data that it will most likely request during a following instruction. For requests for data mapped to even or odd cache banks, use of the present invention now provides the data most likely to be requested in a following instruction. One skilled in the art will appreciate that run time for any given program is significantly reduced.

Figure 7:
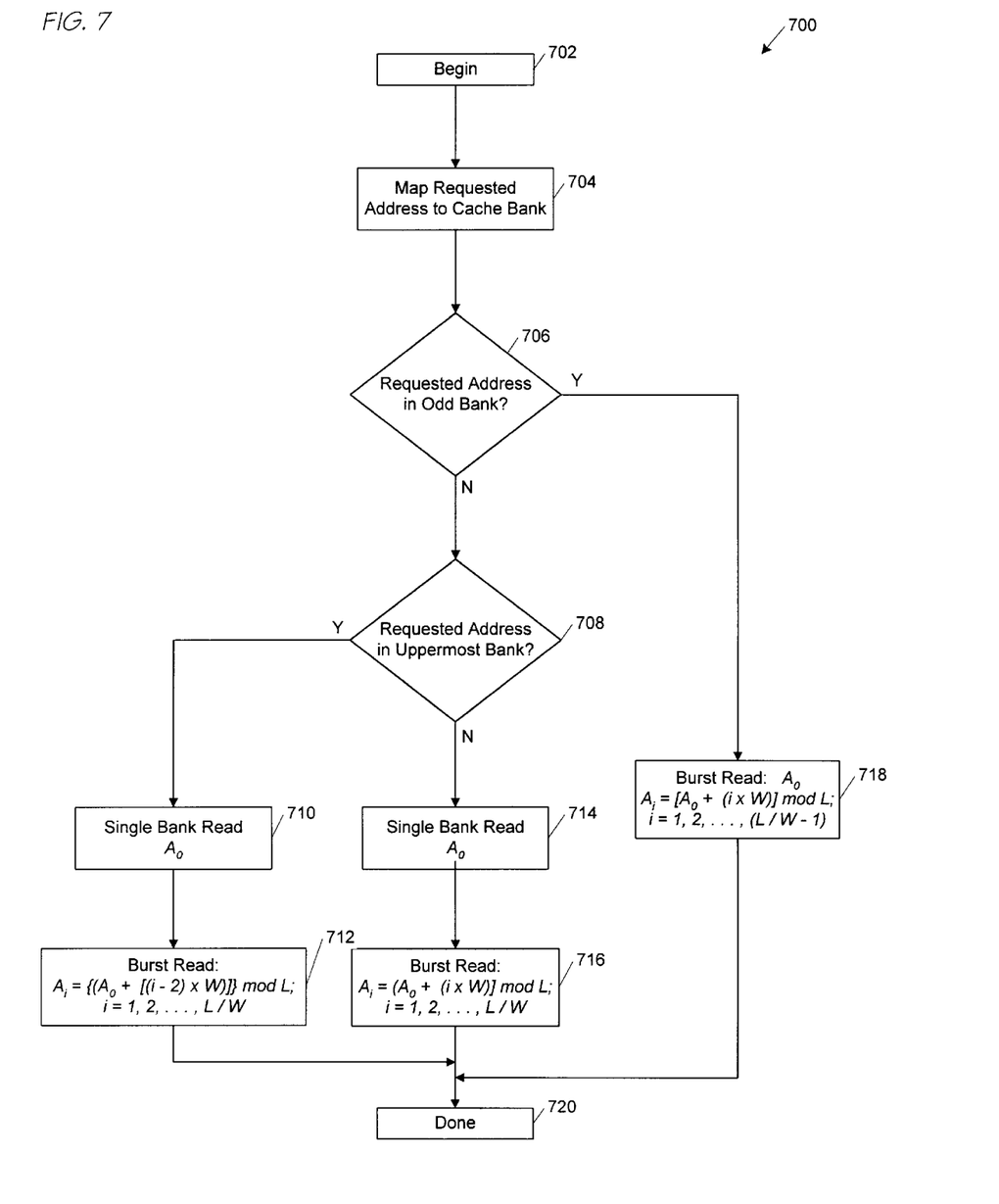
FIG. 7 is a flow chart illustrating the method according to the present invention.

Now referring to FIG. 7, a flow chart 700 is presented describing the method according to the present invention.

The method begins at block 702 and proceeds to block 704.

At block 704, an address of a requested data item is mapped to a particular cache bank within a particular cache line. Flow then proceeds to decision block 706.

At decision block 706, a determination is made whether a the particular cache bank is in an odd position in the particular cache line. If so, then flow proceeds to block 718. If not, then flow proceeds to decision block 708.

At block 718, the particular cache line is filled by performing a burst read to memory. An initial address, $A_0$, is provided on an address bus to memory to retrieve the requested data entity. The initial address, $A_0$, is the base address of the particular cache bank. The remaining addresses in the burst, $A_i$, are generated in sequence according to the expression:

$$A_i = [A_0 + (i \times W)] \bmod L; i = 1, 2, \ldots, \left(\frac{L}{W} - 1\right).$$

Flow then proceeds to block 720, where the method completes.

At decision block 708, a determination is made whether the particular cache bank is in the uppermost position within the particular cache line. If so, then flow proceeds to block 710. If not, then flow proceeds to block 714.

At block 710, the initial address is issued on the address bus to retrieve the requested data entity. Flow then proceeds to block 712.

At block 712, a burst read from memory is executed. The addresses in the burst, $A_i$, are generated in sequence according to the expression:

$$A_i = \{A_0 + [(i - 2) \times W]\} \bmod L; i = 1, 2, \ldots, \frac{L}{W}.$$

Flow then proceeds to block 720, where the method completes.

At block 714, the initial address is issued on the address bus to retrieve the requested data entity. Flow then proceeds to block 716.

At block 716, a burst read from memory is executed. The addresses in the burst, $A_i$, are generated in sequence according to the expression:

$$A_i = [A_0 + (i \times W)] \bmod L; i = 1, 2, \ldots, \frac{L}{W}.$$

Flow then proceeds to block 720, where the method completes.

The flowchart 700 therefore illustrates how a burst transfer of data to fill a particular cache line is performed in a processing system so that the data most likely to be requested by a following instruction is available.

Although the present invention and its objects, features, and advantages have been described in detail, other embodiments are encompassed by the invention. For example, the present invention has been described with reference to filling a cache line in a processing system. It is entirely within the scope of this invention for the cache to reside within a microprocessor, or it may be a cache external to the microprocessor.

In addition, the present invention has been specifically characterized in terms of transfer of data between a memory and a cache unit over a data bus. But it is also applicable to transfers between any type of storage device and a cache unit, or between two cache units.

Furthermore, although the description herein utilizes the example of a cache unit within a microprocessor, one skilled in the art will appreciate that the invention is also applicable to a cache within digital signal processors, numeric processors, and any other device that utilizes a cache.

Moreover, the method herein has been described specifically with reference to a data bus having a width W. A conventional data bus is embodied by a hardwired, parallel connection. However, future improvements to processing systems may include data buses that communicate with cache units in other electromagnetic forms, mediums, and protocols. The present invention anticipates such improvements. The method according to the present invention is applied to provide data entities to fill a cache line in a sequence that is most likely to be required by a requesting processing unit.

Those skilled in the art will appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method for burst transferring of data in a processing system, the processing system having a data bus width of W bytes and a cache line length of L bytes, the cache line having L/W banks, where W and L are even numbers, the lowermost bank being in an odd position and the uppermost bank being in an even position, the method comprising:
   a) determining a particular bank within a particular cache line for storage of a particular data entity;
   b) generating an initial address, $A_0$, for retrieving the particular data entity, wherein the initial address, $A_0$, is the base address of the particular bank;
   c) issuing the initial address, $A_0$, on an address bus to retrieve the particular data entity into the cache line;
   d) if the particular bank within the particular cache line is in an even position, but is not the uppermost bank, generating a sequence of remaining addresses, wherein each one of the remaining addresses is determined relative to the initial address according to the relationship:

$$A_i = [A_0 + (i \times W)] \bmod L; i = 1, 2, \ldots, \frac{L}{W};$$

wherein $A_i$ represents an $i^{th}$ address in the sequence of remaining addresses; and
   e) applying the remaining addresses on the address bus to retrieve remaining data entities into the cache line.

2. The method as recited in claim 1, wherein, if the particular bank within the particular cache line is in an odd position, d) produces each one of the remaining addresses relative to the initial address according to the relationship:

$$A_i = [A_0 + (i \times W)] \bmod L; i = 1, 2, \ldots, \left(\frac{L}{W} - 1\right).$$

3. The method as recited in claim 2, wherein a first address, $A_1$, in the sequence of remaining addresses is a value W bytes greater than $A_0$.

4. The method as recited in claim 2, wherein the sequence of remaining addresses wraps around from the address of the uppermost bank to the address of the lowermost bank.

5. The method as recited in claim 1, wherein, if the particular bank is the uppermost bank, d) produces each one of the remaining addresses relative to the initial address according to the relationship:

$$A_i = \{A_0 + [(i-2) \times W]\} \bmod L; i = 1, 2, \ldots, \frac{L}{W}.$$

6. The method as recited in claim 5, wherein a first address, $A_1$, in the sequence of remaining addresses is a value W bytes less than $A_0$.

7. The method as recited in claim 6, wherein the sequence of remaining addresses wraps around from the address of the uppermost bank to the address of the lowermost bank.

8. The method as recited in claim 1, wherein, upon retrieval of the particular data entity, the particular data entity is stored within the particular bank.

9. The method as recited in claim 1, wherein the initial address, $A_0$, specifies a memory location of a first data byte in the particular bank.

10. The method as recited in claim 9, wherein the address in memory of the particular data entity is within a range specified by the initial address, $A_0$, and an address (W−1) bytes greater than $A_0$.

11. The method as recited in claim 1, wherein c) results in the retrieval of W bytes of data into the particular bank.

12. The method as recited in claim 1, wherein a first address, $A_1$, in the sequence of remaining addresses is a value W bytes greater than $A_0$.

13. The method as recited in claim 1, wherein the sequence of remaining addresses wraps around from the address of the uppermost bank to the address of the lowermost bank.

14. The method as recited in claim 1, wherein the particular cache line is filled by retrieving data from locations in memory prescribed by the initial address and the remaining addresses.

15. A method for burst transferring of data in a processing system, the processing system having a data bus width of W bytes and a cache line length of L bytes, the cache line having L/W banks, where W and L are even numbers, the lowermost bank being in an odd position and the uppermost bank being in an even position, the method comprising:
   a) determining a particular bank within a particular cache line for storage of a particular data entity;
   b) generating an initial address, $A_0$, for retrieving the particular data entity, wherein the initial address, $A_0$, is the base address of the particular bank;
   c) issuing the initial address, $A_0$, on an address bus to retrieve the particular data entity into the cache line;
   d) if the particular bank within the particular cache line is in an even position, but is not the uppermost bank, generating a sequence of remaining addresses, wherein each one of the remaining addresses is determined relative to the initial address according to the relationship:

$$A_i = [A_0 + (i \times W)] \bmod L; i = 1, 2, \ldots, \frac{L}{W}; \text{ or}$$

e) if the particular bank within the particular cache line is the uppermost bank, generating the sequence of remaining addresses, wherein each one of the remaining addresses is determined relative to the initial address according to the relationship:

$$A_i = \{A_0 + [(i-2) \times W]\} \bmod L; i = 1, 2, \ldots, \frac{L}{W};$$

wherein $A_i$ represents an $i^{th}$ address in the sequence of remaining addresses; and
   f) applying the remaining addresses on the address bus to retrieve remaining data entities into the cache line.

16. The method as recited in claim 15, wherein a first address, $A_1$, in the sequence of remaining addresses generated by d), is a value W bytes greater than $A_0$.

17. The method as recited in claim 15, wherein the sequence of remaining addresses wraps around from the address of the uppermost bank to the address of the lowermost bank.

18. The method as recited in claim 15, wherein a first address, $A_1$, in the sequence of remaining addresses generated by e), is a value W bytes less than $A_0$.

19. The method as recited in claim 15, wherein, upon retrieval of th e particular data entity, the particular data entity is stored within the particular bank.

20. The method as recited in claim 15, wherein the initial address, $A_0$, specifies a memory location of a first data byte in the particular bank.

21. The method as recited in claim 20, wherein the address in memory of the particular data entity is within a range specified by the initial address, $A_0$, and an address (W−1) bytes greater than $A_0$.

22. The method as recited in claim 15, wherein c) results in the retrieval of W bytes of data into the particular bank.

23. The method as recited in claim 15, wherein the particular cache line is filled by retrieving data from locations in memory prescribed by the initial address and the remaining addresses.

24. A method for burst transferring of data in a processing system having a data bus width of eight bytes and a cache line length of 32 bytes, the cache line having four sequentially-ordered banks, the method comprising:

a) determining a particular bank within a particular cache line for storage of a particular data entity;

b) generating an initial address, $A_0$, for retrieving the particular data entity, wherein the initial address, $A_0$, is the base address of the particular bank;

c) issuing the initial address, $A_0$, on an address bus to retrieve the particular data entity into the cache line;

d) if the particular bank is bank 2, generating a sequence of four remaining addresses, wherein each one of the remaining addresses is a base address for a next sequential bank within the particular cache line, and wherein, following generation of a base address for bank 4, the sequence wraps back around to generate a base address for bank 1; or e) if the particular bank is bank 4, generating a sequence of four remaining addresses beginning with a base address for bank 3, and continuing next to a base address for bank 4, and continuing next to a base address for bank 1, and completing the sequence with a base address for bank 2; or f) if the particular bank within the particular cache line is bank 1 or bank 3, generating a sequence of three remaining addresses, wherein each one of the remaining addresses is a base address for a next sequential bank within the particular cache line, and wherein, following generation of a base address for bank 4, the sequence wraps back around to generate a base address for bank 1; and g) applying the remaining addresses on the address bus to retrieve remaining data entities into the cache line.

25. The method as recited in claim 24, wherein a first address, $A_1$, in the sequence of remaining addresses is a value eight bytes offset from $A_0$.

26. The method as recited in claim 24, wherein, upon retrieval of the particular data entity, the particular data entity is stored within the particular bank.

27. The method as recited in claim 24, wherein the initial address, $A_0$, specifies a memory location of a first data byte in the particular bank.

28. The method as recited in claim 24, wherein the address in memory of the particular data entity is within a range specified by the initial address, $A_0$, and an address seven bytes greater than $A_0$.

29. The method as recited in claim 24, wherein c) results in the retrieval of eight bytes of data into the particular bank.

30. The method as recited in claim 24, wherein the particular cache line is filled by retrieving data from locations in memory prescribed by the initial address and the remaining addresses.

* * * * *